US012579810B2

(12) United States Patent
    Boiarov et al.

(10) Patent No.: US 12,579,810 B2
(45) Date of Patent: Mar. 17, 2026

(54) SYSTEM AND METHOD FOR AUTOMATIC EVENTS IDENTIFICATION ON VIDEO

(71) Applicants: Constructor Technology AG, Schaffhausen (CH); Constructor Education and Research Genossenschaft, Schaffhausen (CH)

(72) Inventors: Andrei Boiarov, Sofia (BG); Kseniia Alekseitseva, Sofia (BG); Sergey Ulasen, Singapore (SG); Ilya Shimchik, Istanbul (TR); Serg Bell, Singapore (SG); Stanislav Protasov, Singapore (SG); Nikolay Dobrovolskiy, Istanbul (TR)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 0 days.

(21) Appl. No.: 18/322,321

(22) Filed: May 23, 2023

(65) Prior Publication Data

US 2024/0395043 A1    Nov. 28, 2024

(51) Int. Cl.
    *G06V 20/40*        (2022.01)
(52) U.S. Cl.
    CPC .............. *G06V 20/47* (2022.01); *G06V 20/44* (2022.01); *G06V 20/49* (2022.01)
(58) Field of Classification Search
    CPC ......... G06V 20/47; G06V 20/44; G06V 20/49
    (Continued)

(56) References Cited

U.S. PATENT DOCUMENTS

| | | | |
|---|---|---|---|
| 10,390,082 B2 | 8/2019 | Song et al. | |
| 11,438,637 B2 | 9/2022 | Ni et al. | |
| 2006/0003300 A1* | 1/2006 | Davis ................. | A63B 24/0003 |
| | | | 434/247 |
| 2017/0024614 A1* | 1/2017 | Sanil ...................... | G06F 16/70 |

(Continued)

FOREIGN PATENT DOCUMENTS

| | | |
|---|---|---|
| CN | 113132753 A | 7/2021 |
| JP | 2022037876 A | 3/2022 |

(Continued)

OTHER PUBLICATIONS

English Translation of Chinese Publication CN109544650 (Year: 2019).*

(Continued)

*Primary Examiner* — Loi H Tran
(74) *Attorney, Agent, or Firm* — ESPE Legal Consultancy FZ-LLC

(57)        ABSTRACT

Systems and methods for generating video highlights with a certain label and a specific duration (SD) using a trained ranking neural network (RankNet). The system obtains a request for highlight generation, specific duration, and a specific label. The video is split into a set of fragments of pre-defined duration forming a sequence. Digital representation in a form of 3D spatio-temporal embedding is generated for each fragment by a spatio-temporal encoder. Using the embedding value, a rank of each fragment is identified by a trained Ranking Neural Network. Ranks are recorded into a data structure. A minimum number of fragments are selected to cover the SD using a criteria comprising comparing ranks of different fragments. A video highlight is generated from concatenated selected fragments with a truncation, if necessary.

20 Claims, 4 Drawing Sheets

(58) Field of Classification Search
USPC ........................................................ 386/241
See application file for complete search history.

(56) References Cited

U.S. PATENT DOCUMENTS

| | | | |
|---|---|---|---|
| 2017/0109584 A1 | 4/2017 | Yao et al. | |
| 2018/0025078 A1 | 1/2018 | Quennesson | |
| 2018/0301169 A1 | 10/2018 | Ricciardi | |
| 2022/0138474 A1 | 5/2022 | Verma et al. | |
| 2023/0274547 A1* | 8/2023 | Haim ..................... | G06V 20/47 |
| | | | 386/278 |
| 2024/0031619 A1* | 1/2024 | Jayaram .................. | G06F 18/22 |
| 2024/0054160 A1* | 2/2024 | Wu .................... | G06Q 30/0201 |

FOREIGN PATENT DOCUMENTS

| | | |
|---|---|---|
| KR | 101993001 B1 | 6/2019 |
| KR | 20200038667 A | 4/2020 |
| KR | 102456264 B1 | 10/2022 |
| WO | WO-2018017836 A1 | 1/2018 |

OTHER PUBLICATIONS

Yifan Jiao, et al. Three-Dimensional Attention-Based Deep Ranking Model for Video Highlight Detection, published Mar. 15, 2018. Abstract only.

Michael Gygli, et al. Video2GIF: Automatic Generation of Animated GIFs from Video, May 16, 2016.

Lezi Wang, et al. Learning Trailer Moments in Full-Length Movies with Co-Contrastive Attention. Dec. 4, 2020.

Medhini Narasimhan, et al. CLIP-It! Language-Guided Video Summarization, Dec. 8, 2021.

Haoqi Fan, et al. Multiscale Vision Transformers, (2021).

Christoph Feichtenhofer, et al. SlowFast Networks for Video Recognition, Oct. 29, 2019.

* cited by examiner

System 100

200

Video source 202

Collection of K fragments of PD duration 204

Collection of K 3D spacio-temporal embeddins 206

Collection of K Rankings 208

Selected N embeddings 210

A Highlight generated form N fragments matching the selected N embeddings 212

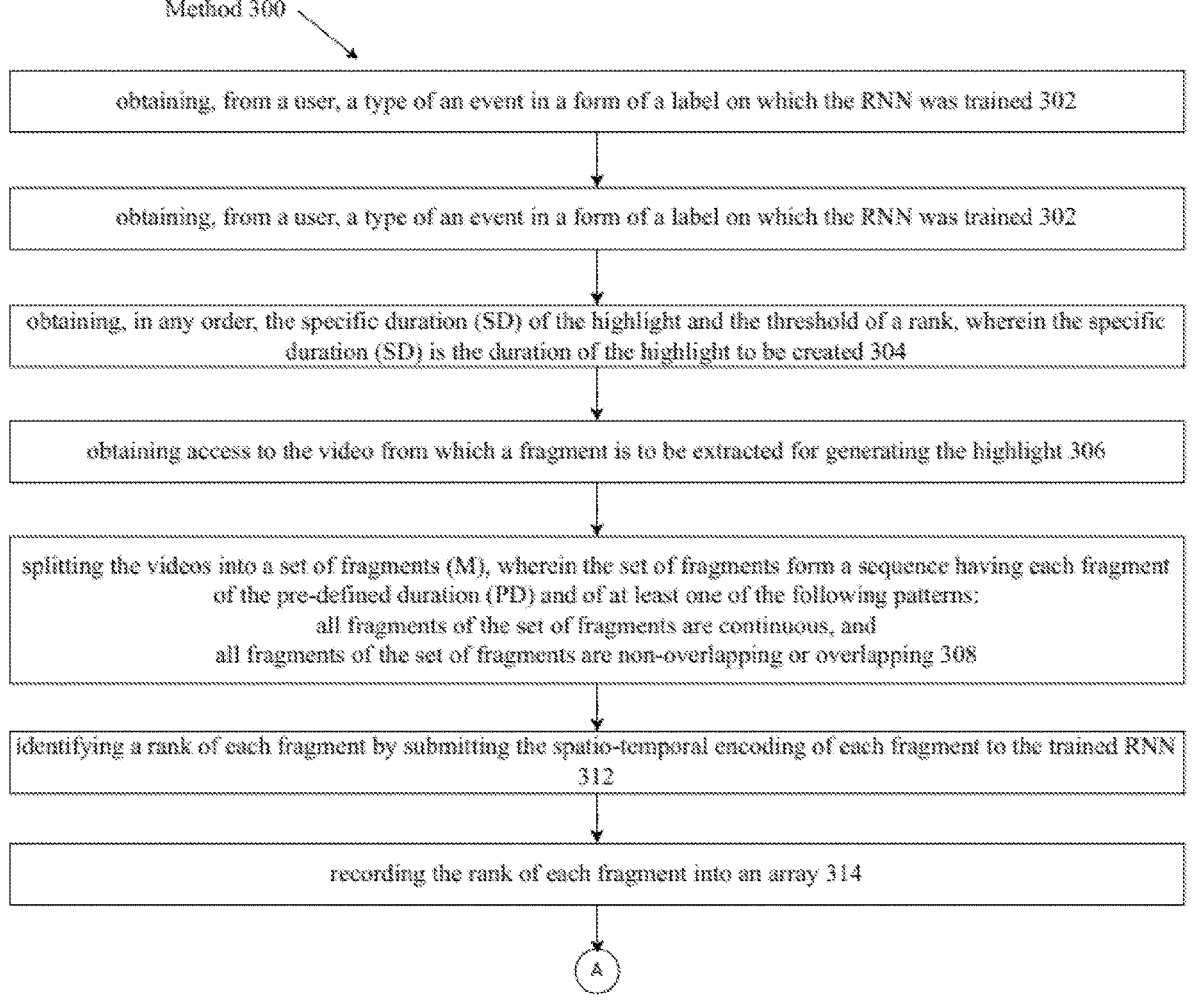

Method 300 obtaining, from a user, a type of an event in a form of a label on which the RNN was trained 302 obtaining, from a user, a type of an event in a form of a label on which the RNN was trained 302 obtaining, in any order, the specific duration (SD) of the highlight and the threshold of a rank, wherein the specific duration (SD) is the duration of the highlight to be created 304 obtaining access to the video from which a fragment is to be extracted for generating the highlight 306 splitting the videos into a set of fragments (M), wherein the set of fragments form a sequence having each fragment of the pre-defined duration (PD) and of at least one of the following patterns:
all fragments of the set of fragments are continuous, and
all fragments of the set of fragments are non-overlapping or overlapping 308 identifying a rank of each fragment by submitting the spatio-temporal encoding of each fragment to the trained RNN 312 recording the rank of each fragment into an array 314

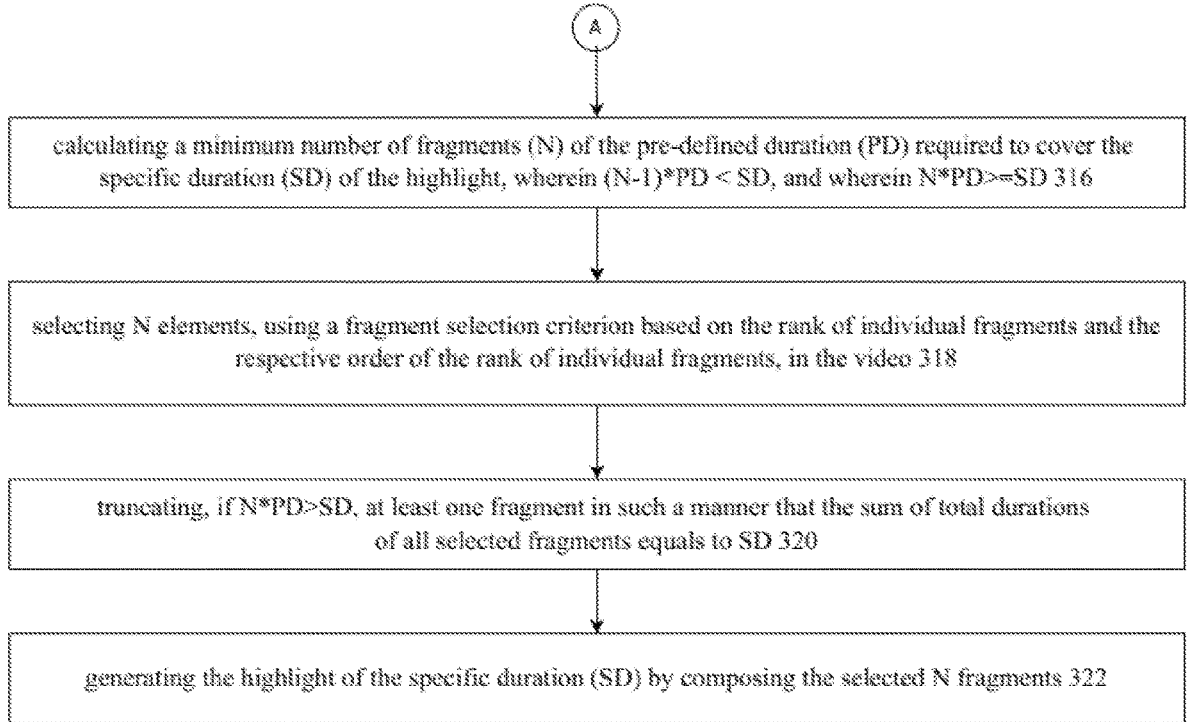

calculating a minimum number of fragments (N) of the pre-defined duration (PD) required to cover the specific duration (SD) of the highlight, wherein (N-1)*PD < SD, and wherein N*PD>=SD 316 selecting N elements, using a fragment selection criterion based on the rank of individual fragments and the respective order of the rank of individual fragments, in the video 318 truncating, if N*PD>SD, at least one fragment in such a manner that the sum of total durations of all selected fragments equals to SD 320 generating the highlight of the specific duration (SD) by composing the selected N fragments 322

FIG. 3 (cont-d)

SYSTEM AND METHOD FOR AUTOMATIC EVENTS IDENTIFICATION ON VIDEO

TECHNICAL FIELD

The present disclosure generally relates to automatic processing of digital video, deep learning, and neural networks. In particular, the present disclosure relates to generating highlights from a digital video.

BACKGROUND

May it be any personal or commercial event, field games, video games, entertainment programs or any other event, organizers tend to either record the videos or perform live broadcast or opt for both options. In any case, recording or live broadcasts, video programs can be lengthy. Such video programs can be fragmented to create shorter video clips that can be used to represent the video programs for marketing and other purposes. For example, highlights showing all the goals scored during a football match can be generated from the recorded video of the game. Additionally, certain fragments of the video programs are used as stand-alone clips for distribution. Such fragments may represent the most interesting, crucial, or otherwise relevant segment of the event.

Short video clips of lengthy video programs are useful because short clips can be replayed during pauses in the game, to show in the news, in post-game commentaries, or to publish as stand-alone clips or parts of compositions of such clips. Different objectives for using the highlights may require the highlights to be of specific length or duration and to include a particular type of elements of the video, for example, video clips of players scoring a goal or saving a goal in a football game, or a car passing another car in a car racing competition.

Manually fragmenting recorded video to create such highlights can be a time consuming and tedious process. Moreover, a person having in-depth knowledge of such events will be required to assess the video and identify the most important fragments correctly, which makes the manual process human-dependent and prone to human errors. Furthermore, the process becomes more complicated and less reliable if the highlights must be generated of a specific duration as the process becomes dependent on the best judgment of the person generating the highlights for selecting the clips and a duration of each clip.

Therefore, there is a need for a method and a system to generate the highlights of a video program of a specific duration and a specific type.

SUMMARY

The present disclosure relates to systems and methods for automatically generating a video highlight from a longer video or a video stream. The highlight can be composed using one or more fragments that are video clips of a pre-defined duration (PD) using a previously configured ranking neural network (RankNet) trained on video fragments with a certain label and the same pre-defined duration (PD).

In an embodiment, disclosed herein is a computer implemented method for generating a video highlight of a certain label and a specific duration (SD) by implementing a recognition system for automatically recognizing at least one video-clip of the pre-defined duration (PD) using a trained ranking neural network. A method includes obtaining, from a user, a type of an event in a form of a label on which the RankNet was trained; obtaining, in any order, the specific duration (SD) of the highlight, wherein the specific duration (SD) is the duration of the highlight to be created; obtaining access to the video from which a fragment is to be extracted for generating the highlight; splitting the video into a set of fragments, wherein the set of fragments form a sequence, each fragment being of the pre-defined duration (PD); identifying a rank of each fragment by submitting a spatio-temporal encoding of each fragment to the trained RankNet; recording the rank of each fragment into a data structure; calculating a minimum number of fragments (N) of the pre-defined duration (PD) required to cover the specific duration (SD) of the highlight, wherein $(N-1)*PD<SD$, and wherein $N*PD \geq SD$; selecting N fragments, using a fragment selection criterion based on the rank of individual fragments and the respective order of the rank of individual fragments, in the video; truncating, if $N*PD>SD$, at least one fragment in such a manner that the sum of total durations of all selected fragments equals to SD; and generating the highlight of the specific duration (SD) by composing the selected N fragments.

In one aspect, the fragments of pre-defined duration PD are overlapping or not overlapping.

In one aspect, the fragment selection criteria comprises selecting the first or last sequence of N consecutive fragments, N being the minimal number of fragments necessary to cover the duration SD of the highlight, with maximum value of a sum of the respective ranks of N fragments in the video.

In one aspect, the fragment selection criteria comprises selecting the first of the N fragments with a highest rank.

In one aspect, the fragment selection criteria comprises selecting N consecutive fragments with at least one of the following conditions: starting with the first fragment with a maximum rank from the video, starting with the last fragment with a maximum rank from the video, ending with the first fragment with a maximum rank from the video, and ending with the last fragment with a maximum rank from the video.

In one aspect, splitting the videos into a set of fragments further comprises excluding a last fragment from the set of fragments if the length of the last fragment is less than the pre-defined duration (PD).

In one aspect, splitting the videos into a set of fragments further comprises creating a last fragment of the pre-defined duration (PD) that ends at the end of the video and overlaps with a previous fragment.

In one aspect, methods further include receiving a request for producing H different highlights from the video; producing one highlight at a time; and excluding the produced highlight from a subsequent round of selecting.

In one aspect, excluding the produced highlight from a subsequent round of selecting further comprises imposing a condition that a new highlight cannot start with $S \geq 0$ from the produced highlight, wherein S is a duration of time or a number of fragments.

In an embodiment, a system to generate a video highlight of with a certain label and a specific duration (SD) a video using a recognition system for automatically recognizing at least one fragment of the pre-defined duration (PD) from the video using a trained ranking neural network comprises a video processor configured to: obtain a type of an event in a form of a label on which the neural network is trained, obtain the specific duration (SD) of the highlight, obtain access to the video from which a fragment is to be extracted, and split the videos into a set of fragments, each fragment being of the pre-defined duration (PD); a ranking network configured to: receive a spatio-temporal encodings of fragments of the pre-defined duration (PD) as an input to identify a rank of each fragment by the trained machine learning module; record the rank of each fragment into a data structure; calculate a minimum number of fragments (N) of the pre-defined duration (PD) required to cover the specific duration (SD), wherein $(N-1)*PD<SD$, and wherein $N*PD \geq SD$; select N elements using the criteria based on fragment's rank and position; and truncate, if $N*PD>SD$, at least one fragment to make the total duration of all selected fragments equal to the specific duration (SD); and an inference module to generate the fragment of the specific duration (SD) by composing the selected fragments.

In one aspect, a system further includes a three-dimensional (3D) spatio-temporal encoder configured with float-values vector ranging from 512 to 2048.

BRIEF DESCRIPTION OF THE DRAWINGS

FIG. 3 is a flowchart of a method for generating highlights for a video of a certain type and specific duration, in accordance with an embodiment.

DETAILED DESCRIPTION

The present disclosure relates to systems and methods for generating video highlights of a certain type and a specific duration (SD). The system and method, in particular, relates to using a pre-configuring neural network to automatically generating video highlights of the certain type and specific length SD using a recognition system for automatically recognizing at least one video-clip of pre-defined duration (PD) using a pre-trained ranking neural network (RankNet). The system can receive a request from a user to create video highlights of specific length using video feed or stream. The video can be split into a set of fragments, having each fragment of the pre-defined duration PD. Each fragment can be ranked, and based on the ranking, the fragments are selected to generate the video highlight.

Figure 1:
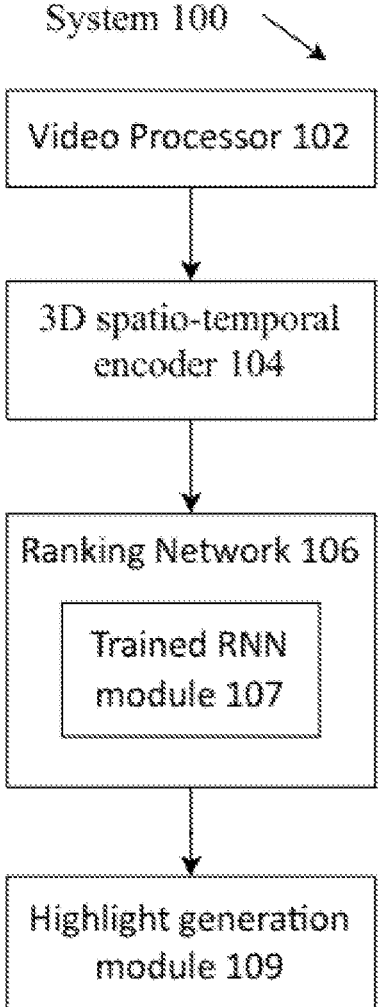
FIG. 1 is a block diagram of a system, in accordance with an embodiment.

FIG. 1 is a block diagram of a system 100, in accordance with an embodiment. The system 100 is configured to generate video highlights for a video of a certain type and specific length SD. The system comprises a video processor 102, a spatio-temporal encoder 104, and a ranking network 106. In embodiments, though not depicted, system 100 can further include an input/output engine to communicate with computing devices external to system 100.

In an embodiment, the video processor 102 is configured to process a video of at least one type of event. The video processor 102 can process digital videos received by the system 100 from at least one video source, such as multimedia databases where the videos are stored or directly from the image capturing devices implemented to capture the videos. In an embodiment, the video processor 102 can be a single processing device or a plurality of processing devices. Examples of the processing device are a microprocessor, micro-controller, digital signal processor, microcomputer, central processing unit, field programmable gate array, programmable logic device, state machine, and/or any device that can be configured to perform operational instructions. In an embodiment, the video processor 102 comprises an associated memory and/or memory element, which can be a single memory device, a plurality of memory devices, and/or embedded circuitry of the video processor.

In an embodiment, the video processor 102 is further configured to receive at least one type of event in a form of certain label for analyzing a video. The video can be classified based on type of events, such as sport events, personal events, commercial events and so on. Such events can further be classified as sub-events, for example, the sport event can be classified based on the type of sports, such as football, tennis, badminton, cricket, and so on. The video processor 102 can be configured to select at least one type of video. For example, a football type can be selected for analyzing videos recorded during the football matches.

In an implementation, the video processor 102 is configured to obtain, from a user, a type of an event in the form of a label on which the ranking neural network (RankNet) was trained. The user can furnish details of the type of the label, such as sport event, racing car event and the like. The trained RankNet module 107 is pre-trained to identify ranking values of the video fragments.

For example, the video processor 102 can receive an instruction from a user via a user interface on a device of the video processor 102. In another example, the video processor 102 can receive a communication from a user device operably coupled to the device of the video processor 102. In another example, the input/output engine can receive the label communication and pass the communication to the video processor 102.

In an embodiment, the video processor 102 is configured to obtain the specific duration (SD) of the highlight, or in other words, the duration of a highlight to be created. In another embodiment, the video processor 102 is further configured to receive a threshold of a rank. For example, the specific duration (SD) of the highlight is a desired length of the highlights as requested by the user (e.g. one minute). The threshold of the rank is a ranking value considered as a threshold value, where the fragments with ranking value higher than or equal to the threshold value may be selected for highlight generation. In another embodiment, the selection criteria includes select fragments corresponding to a maximum rank value of individual fragments or groups of fragments of pre-defined duration PD. In an embodiment, at least one of the average, mean, median, or sum of the ratings of fragments can be used in the fragment selection criteria. In another embodiment, specific durations SDs of a plurality of fragments can be considered. For example, for a threshold value (e.g. one minute), two or more fragments can be concatenated to create a single video; a first fragment of 20 seconds and a second fragment of 40 seconds within the threshold value.

In an embodiment, the video processor 102 is configured to obtain access to the video from which a fragment is to be extracted for generating the highlight. For example, the video can be recorded on a device of the video processor 102. In another example, the video processor 102 can receive a communication from a device operably coupled to the device of the video processor 102, such as a user device, database, or other computing device. In an embodiment, the input/output engine can receive the communication and pass it to the video processor 102.

In an implementation, the video processor 102 is configured to split the video into a set of fragments of a pre-defined duration PD. The pre-defined duration PD is a parameter that was selected prior to the training of the RankNet. In an embodiment, the video of full length can be fragmented to include specific incidents or occurrences from the event. For example, in a video of a football match, the video can be fragmented to accumulate the only video clips showing the goals scored. Such fragments are split up from the video for creating a video clip showing only goal scoring moments. In another embodiment, a segment depicting instrumental events of the video can be fragmented from the video. For example, in a video of a parliamentary session, a segment of the video that represents a speech delivered by a prime minister of a country can be split up for creating a video clip showing only the highlight or highlights of the prime minister's address and skipping the rest of the event.

There are different methods of extracting M fragments from a video. Each M fragment contains continuous video frames as the frames go in the video.

In an embodiment, a pair of two different M fragments can contain one or more common video frames. These two M fragments intersect.

In an embodiment, a pair of two different M fragments do not contain any common video frames. These two M fragments do not intersect.

M fragments in a collection of M fragments do not intersect if any two M fragments from the collection do not intersect.

In an embodiment, the second M fragment starts with the first video frame from the video that follows the last video frame of the first M fragment. These two M fragments, the first and the second, are continuous.

A collection of M fragments is continuous, if each fragment in that collection starting with the second fragment is continuous with the previous M fragment.

The M fragments can be split in such a manner that M fragments form a sequence. There can be multiple sequences for each video. Each sequence can include one or more fragments. The sequence can be formed by different patterns. In one embodiment, the sequence is formed with all fragments of the set of fragments being continuous. In another embodiment, the sequence is formed with all fragments of the set of fragments that are non-overlapping. In another implementation, the sequence is formed with all fragments of the set of fragments that are overlapping.

In embodiments, a sequence is formed with multiple fragments or single, such as fragments that are non-overlapping and fragments that are overlapping. In embodiments, fragments can be any fragments that may be of interest to the viewer. For example, in an embodiment of a 5-second sequence, the sequence can include multiple 0.5 second fragments from different M fragments of a video (both non-overlapping and overlapping). In another embodiment of a 5-second sequence, the sequence can include kaleidoscope-type M fragments (both non-overlapping and overlapping). In another embodiment of a 5-second sequence, the sequence can include a single continuous 5-second episode comprised of continuous M fragments.

In an embodiment, the action of generation of fragments of pre-defined duration PD is followed by the action of sending each fragment to a Convolution Neural Network (CNN) to only select a portion of the fragment for further processing. In deep learning, CNN is a class of artificial neural networks (ANN). CNN is a local connected neural network model, which extracts local features by restricting the receptive fields of the hidden units. A typical CNN comprises a number of convolutional layers and then followed by one or more fully connected layers. CNNs are based on the shared-weight architecture of the convolution kernels or filters that slide along input features and provide translation-equivariant responses known as feature maps. 3D CNN is the one of the main deep neural networks models that can effectively process spatio-temporal data of videos.

Spatiotemporal data are data that relate to both space and time, which can predict change and attributes in complex systems in space and time by integrating diverse data and knowledge. 3D CNN may receive an input in the form of a tensor with four dimensions which comprises 3 (frames channels number), T (frames number), H (frames height), and W (frames width). In some examples, 3D CNN is a 3D Residual Network (ResNet), SlowFast, or X3D.

The sequence of the fragments is provided to the three-dimensional (3D) spatio-temporal encoder 104 for further processing to generate three-dimensional (3D) spatio-temporal encoding of generated fragments of the pre-defined duration PD. The 3 dimensions include two spatial dimensions and one temporal dimension.

In an embodiment, the system 100 further comprises a three-dimensional (3D) spatio-temporal encoder 104. The output of the encoder 104 is in the form of embedding, a numeric vector of fixed size. The numeric value vector is a representation of a three-dimensional spatio-temporal representation of the video clip of the pre-defined duration PD. In an embodiment, the dimension of the float-values is 512 to 2048. Output of the encoder 104 is provided to the ranking network 106 as an input.

In an embodiment, the encoder 104 is configured to receive video clips or fragments of pre-defined duration from the video processor as an input. The encoder 104 is further configured to generate a three-dimensional (3D) embedding vector of each clip by applying a spatio-temporal encoding technique on the selected clips, irrespective of the order of the clips.

In an embodiment, the encoder 104 is configured to pass the generated encoding to a previously trained machine learning module comprising a ranking neural network Rank-Net such as the ranking network 106, which is described further below. Training the machine learning module involves an operation of data sampling. The machine learning module may consider a certain type of label for the training. For example, a sports event. In one example, the video clips with the certain label are included in the highlights, and other video clips with a label other than the certain label may be excluded from the highlights. For example, in the automatic video highlights generation system for the race videos the video types may include occurrences, such as overtaking, crash, reversal, collision, race start, victory celebration, and the like. In an embodiment, multiple labels can be utilized for data sampling. For example, video clips corresponding to content with a first label of the sports event and a second label with a particular feature of the sports event can further be included, and video clips corresponding to content without the first label and the second label can be excluded.

In one implementation, the encoder 104 can be pretrained on several public datasets. In some examples, the pre-training datasets are Kinetics 400/600/700, Moments in Time, ActivityNet, UCF-101, or HMDB-51.

The system 100 further comprises the ranking network 106. The ranking neural network (RankNet) 106 is trained to generate a ranking for each temporal-spatial encoding of a video clip of pre-defined duration PD based on a query. In an embodiment, a query comprises at least one of the labels on which the RankNet 106 was trained. The ranking neural network (RankNet) 106 is a neural network that produces a numeric rank in response to a query and a temporal-spatial encoding of a video clip of pre-defined duration PD. Ranking the queries received from the user is an instrumental task in information retrieval. The ranking neural network (Rank-Net) 106 is configured to determine a rank of each temporal-spatial encoding of a video clip of pre-defined duration PD in the set according to the query.

In an embodiment, the ranking network 106 is configured to receive the total number of the embeddings of the M fragments generated by the encoder 104. The ranking network 106 is based on a ranking neural network (RankNet) which is pre-trained to assign a rank to each fragment of the requested certain label. The ranking network also comprises a highlight generation module 109 for automatically recognizing at least one sequence of the fragments of the pre-defined duration (PD) using the trained RankNet module 107. RankNet is trained with a training set of fragments of pre-defined duration PD, where the duration of PD is fixed. The recognition system is enabled to analyze the ranks of the embeddings of all of the fragments and select the N elements covering the requested length or specific duration SD. Further, the rank for each M fragment is calculated using the trained RankNet module 107. The ranking network 106 is further configured to record each of the ranks into an array, thereby preserving the relationship between a fragment and its rank. Each rank can be recorded into the array without any particular order.

In an embodiment, the rank values, as identified by the ranking network 106, are recorded into an array. The array is a collection of fragments of the same type or certain label stored at contiguous memory locations. In other embodiments, the rank values can be recorded into other suitable data structures, such as linear data structures like a stack, a linked list, or a queue.

In an embodiment, the highlight generation module 109 of the ranking neural network (RankNet) 106 is configured to calculate a minimum number of fragments (N) of the pre-defined duration (PD) required to cover the specific duration (SD) of the highlight, where $(N-1)*PD<SD$ and $N*PD \geq SD$. Each fragment is of the pre-defined duration (PD) which is fixed, and specific duration (SD) of the requested highlight is obtained as an input. Therefore, the number N of PDs that can cover SD are calculated. In one scenario, the fragments with the pre-defined duration PD may not fit, in their entirety, into the specific duration SD of the requested highlight. For example, the predefined length of a fragment is 30 seconds, and the requested specific duration SD of the highlight is 100 seconds. In that example a total of N=3 fragments of the pre-defined length PD are needed to cover the length of the highlight, yet the combined duration of these three selected fragments $3 \times PD=120$ will exceed the duration SD=100 of the highlight. In another example, the combined duration of the selected fragments falls short to the requested specified duration SD of the highlight. Therefore, the selection of the fragments with specific duration must be performed considering the requested length of the highlights. In an embodiment, the highlight generation module 109 returns an error and stops the process if the combined duration of the selected fragments of pre-defined duration PD falls short of the requested specified duration SD In another embodiment, the highlight generation module 109 uses an extrapolation or video expansion algorithm to extend the duration of the selected fragments to SD. In another embodiment, a video clip or a collection of video clips from a predefined source are used to fill the difference in time. In an embodiment, such an additional video clip is appended in front of the collection of selected fragments, at the end of the collection, or inserted inside the collection.

In an embodiment, for each of the fragments, where M−N+1, consecutive sequences of N fragments in the array with the rank and the total sum of ranks corresponding to M−N+1 fragments is calculated by the ranking network 106.

According to some embodiments, the highlight generation module 109 is configured to select the sequence of length N fragments with the highest sum of the ranks. In an embodiment, if the highest sum of the ranks is achieved on several sequences, at least one sequence is selected.

In an embodiment, if multiple sequences score the highest-ranking sum, a first sequence from the multiple sequences is selected.

In an embodiment, the highlight generation module 109 is configured to select N elements in the video, using a fragment selection criterion based on the rank of individual fragments and the respective order of the rank of individual fragments.

In an embodiment, if multiple sequences score the highest-ranking sum, an external criterion is applied to select the sequence. The external criteria can include information of other highlights already produced from that video, or whether the first or the last sequence is selected. Accordingly, based on other highlights or the first or last sequence selected and relative to a characteristic of the fragments in the sequence (e.g. a label), a coherent overall sequence can be created.

In an embodiment, if multiple sequences score the highest-ranking sum, a set of rules is applied to select at least one sequence from the several sequences with the highest ranking sum.

In an embodiment, if multiple sequences score the highest-ranking sum, the sequence containing the fragment with the highest rank is selected.

In an embodiment, if multiple sequences score the highest-ranking sum, the sequence with the highest minimum of all ranks is selected.

In an embodiment, if multiple sequences score the highest-ranking sum, an additional condition is applied, for example, the condition of containing the highest-ranking fragment. Thus, the sequence having the highest-ranking fragment is selected.

In an embodiment, if multiple sequences score the highest-ranking sum, an additional condition is applied, for example, the condition having the largest sum of K out of N highest scores in the sequence.

In an embodiment, the highlight generation module 109 is configured to truncate at least one fragment if the length of N consecutive clips is greater than the requested length of a highlight. In one implementation the first fragment of the sequence is truncated. In another implementation, a certain other defined (e.g. median or last) fragment of the sequence is truncated. In yet another implementation, the fragment with the lowest rank is truncated.

In an embodiment, the system 100 receives a request to produce H different highlights from the video, such as through a request via input/output engine or highlight generation module 109. In this particular embodiment, the system 100 produces one highlight at a time, excluding produced highlights from the next round of selection. In an embodiment, the fragments, which are the part of the produced highlights not excluded from future searches, but a condition that new highlights cannot start with $S \geq 0$ from the already produced highlight, wherein S is the duration of time or the number of fragments. For example, the next highlight cannot start, in case if S=0, with the same clip as any of the previously produced highlights.

Therefore, by selecting the fragments or a sequence of the fragments having the highest sum of the ranking values generated by the trained RankNet module 107, the system can generate the video highlights of the requested length.

Figure 2:
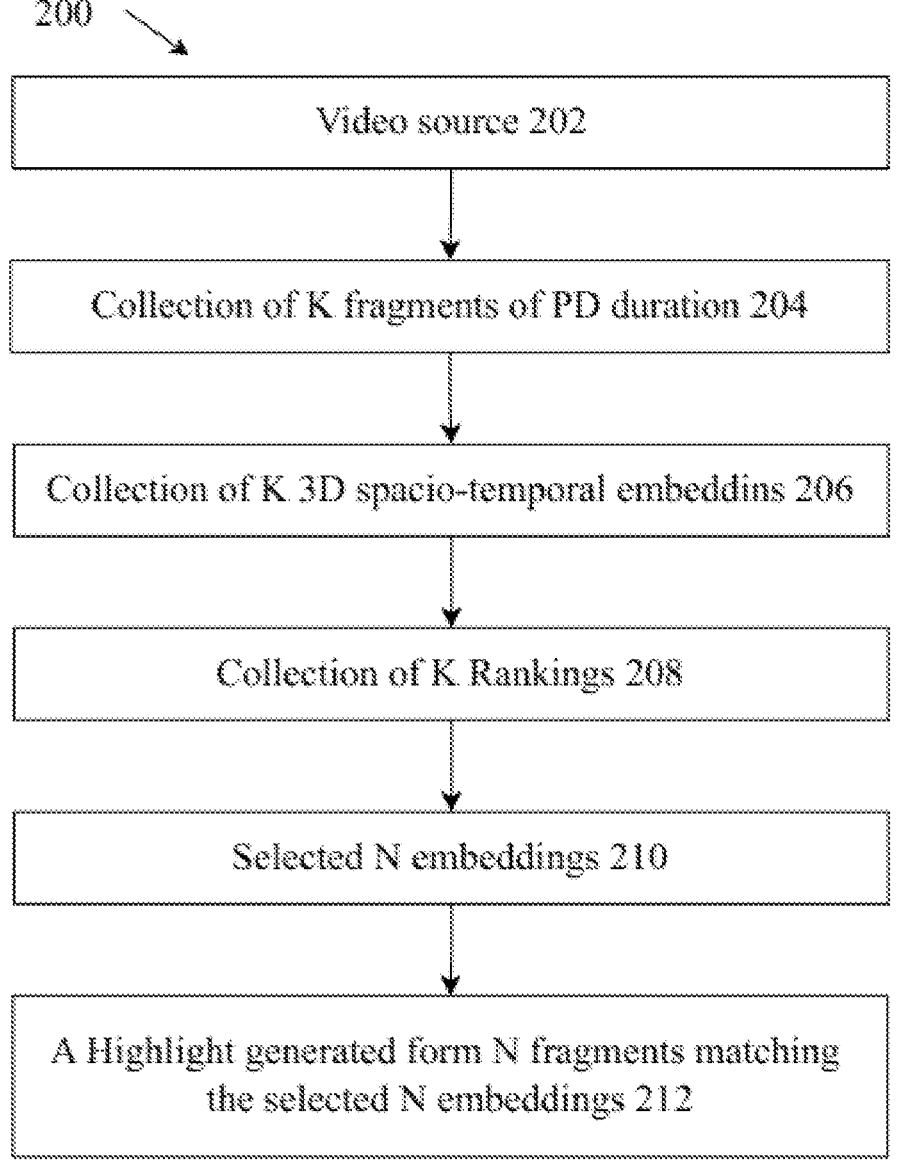
FIG. 2 is a data flow diagram of functions performed by the system, in accordance with an embodiment.

FIG. 2 is a data flow diagram of the functions 200 performed by the system 100, in accordance with an embodiment. In an embodiment, the functions include generating video from a video source 202, collecting K fragments of PD duration 204, collecting of K 3D spatio-temporal embeddings 206, collecting of K rankings 208, selecting of N embeddings 210, and composing a highlight from fragments corresponding to the selected N embeddings 212.

The video fragments from the input video source of the pre-defined duration PD, generated by the video processor 102 as part of function 202. The video fragments are provided to the spatio-temporal encoder 104 as part of function 204. The video source is a video clip or a video stream depicting the event of selected type for which the ranking neural network (RankNet) has been trained. The spatio-temporal encoder 104 is configured to generate 3D embedding vectors for each fragment of duration PD as part of function 206. Embedding vectors 204 of the main video clip is provided to the ranking neural network (RankNet) 106 as part of function 208. A recognition system can analyze the ranks of the embeddings of all of the fragments and select the N elements covering the requested length or specific duration SD at function 210. The highlight generation module 109 can use the N fragments matching the N selected embeddings to generate the highlight at 212.

FIG. 3 is a flowchart of a method 300 for generating video highlights of a certain label and a specific duration (SD) using a recognition system for automatically recognizing at least one video-clip of the pre-defined duration (PD) using a trained ranking neural network (RankNet). The method 300 can be implemented by the system 100 including the encoder 104 and the ranking network 106.

At 302, a type of an event, also alternatively referred to as the certain label, is obtained from the user. The type of the event may be obtained in the form of a label on which the ranking neural network was trained.

At 304, certain parameters required for highlight generation are obtained from the user. The certain parameters may include, irrespective of the order, specific duration (SD) of the highlight, and/or the duration of a highlight to be created. In an embodiment, the threshold of a rank is also received.

At 306, access to the video from which a fragment is to be extracted for generating the highlight is obtained. The video can be a recorded video, a video feed, or a video stream.

At 308, the video is split into a set of fragments. In embodiments, the video is further split into a sequence of the set of fragments. Each fragment corresponds to the pre-defined duration (PD) and at least one of the patterns. The patterns can be formed where all fragments of the set of fragments are continuous, and all fragments of the set of fragments are non-overlapping, or overlapping.

At 310, a rank of each fragment is identified by submitting the spatio-temporal encoding of each fragment to the trained RankNet. The RankNet can be a pre-trained neural network trained to recognize a certain type of videos. By processing, embedding the value of each fragment, RankNet identifies the ranking value corresponding to each fragment. At 312, the rank of each fragment is recorded into a data structure such as an array.

At 314, a minimum number of fragments (N) is calculated. The N fragments of the pre-defined duration (PD) are required to cover the specific duration (SD) of the highlight. In one implementation, $(N-1)*PD<SD$ and $N*PD\geq SD$.

At 316, N elements from the video are selected. The N elements are selected using a fragment selection criterion based on the rank of individual fragments and the respective order of the rank of individual fragments.

At 318, if $N*PD>SD$, at least one fragment is truncated in such a manner that the sum of total durations of all selected fragments equals to SD.

At 320, the highlight of the specific duration (SD) is generated by composing the selected n fragments.

The invention claimed is:

1. A computer implemented method for generating a video highlight of a certain label and a specific duration (SD) by implementing a recognition system for automatically recognizing at least one video-clip of the pre-defined duration (PD) using a trained ranking neural network (RankNet), the method comprising:

obtaining, from a user, an event type in a form of a label, wherein data corresponding to the event type is included in the data on which the RankNet was trained and data not corresponding to the event type is excluded in the data on which the RankNet was trained;

obtaining the specific duration (SD) of the highlight, wherein the specific duration (SD) is the duration of the highlight to be created;

obtaining access to the video from which a fragment is to be extracted for generating the highlight, wherein the video corresponds to the event type;

splitting the video into a set of fragments, wherein the set of fragments form a sequence, each fragment being of the pre-defined duration (PD);

encoding each fragment into a spatio-temporal encoding of each fragment after splitting the video and forming the sequence, each spatio-temporal encoding comprising two spatial dimensions and one temporal dimension in an embedding vector of fixed size;

querying, with a plurality of queries, the RankNet, wherein each query in the plurality of queries comprises at least the spatio-temporal encoding of each fragment and the label on which RankNet was trained;

identifying a rank of each fragment within of all of the plurality of queries;

recording the rank of each fragment into a data structure, wherein each fragment and the rank of the fragment are recorded in the data structure without a particular order;

calculating a minimum number of fragments (N) of the pre-defined duration (PD) required to cover the specific duration (SD) of the highlight, wherein $(N-1)*PD<SD$, and wherein $N*PD\geq SD$;

selecting N fragments, using a fragment selection criterion based on the rank of individual fragments wherein the rank of each fragment is considered according to an individual fragment selection criteria and a respective group rank of a plurality of individual fragments is considered according to a group fragment selection criteria, in the video;

truncating, if $N*PD>SD$, at least one fragment as a truncated fragment in such a manner that the sum of total durations of all selected fragments including the truncated fragment equals SD; and generating the highlight of the specific duration (SD) by composing the selected N fragments.

2. The method of claim 1, wherein the fragments of pre-defined duration PD are overlapping or not overlapping.

3. The method of claim 1, wherein the fragment selection criteria comprises selecting the first or last sequence of N consecutive fragments, N being the minimal number of fragments necessary to cover the duration SD of the highlight, with maximum value of a sum of the respective ranks of N fragments in the video.

4. The method of claim 1, wherein the fragment selection criteria comprises selecting the first of the N fragments with a highest rank.

5. The method of claim 1, wherein the fragment selection criteria comprises selecting N consecutive fragments with at least one of the following conditions:

starting with the first fragment with a maximum rank from the video, starting with the last fragment with a maximum rank from the video, ending with the first fragment with a maximum rank from the video, and ending with the last fragment with a maximum rank from the video.

6. The method of claim 1, wherein splitting the videos into a set of fragments further comprises excluding a last fragment from the set of fragments if the length of the last fragment is less than the pre-defined duration (PD).

7. The method of claim 1, wherein splitting the videos into a set of fragments further comprises creating a last fragment of the pre-defined duration (PD) that ends at the end of the video and overlaps with a previous fragment.

8. The method of claim 1, further comprising:

receiving a request for producing H different highlights from the video;

producing one highlight at a time; and excluding the produced highlight from a subsequent round of selecting.

9. The method of claim 7, wherein excluding the produced highlight from a subsequent round of selecting further comprises imposing a condition that a new highlight cannot start with a same fragment as in the produced highlight.

10. A system to generate a video highlight of with a certain label and a specific duration (SD) a video using a recognition system for automatically recognizing at least one fragment of the pre-defined duration (PD) from the video using a trained ranking neural network, the system comprising:

a video processor configured to:

obtain an event type in a form of a label, wherein data corresponding to the event type is included in the data on which the neural network is trained and data not corresponding to the event type is excluded in the data on which the RankNet was trained, obtain the specific duration (SD) of the highlight, obtain access to the video from which a fragment is to be extracted, wherein the video corresponds to the event type, and split the videos into a set of fragments, each fragment being of the pre-defined duration (PD);

a three-dimensional spatio-temporal encoder implemented by instructions for at least one processor using memory coupled to the at least one processor, the three-dimensional spatio-temporal encoder configured to encode each fragment into a spatio-temporal encoding of each fragment after splitting the video and forming the sequence, each spatio-temporal encoding comprising two spatial dimensions and one temporal dimension in an embedding vector of fixed size;

a ranking network comprising a neural network model implemented by instructions for the at least one processor using memory coupled to the at least one processor, the ranking network configured to:

receive a plurality of queries including a spatio-temporal encoding of the fragments of the pre-defined duration (PD) and the label on which the ranking network was trained as an input to identify a rank of each fragment within of all of the plurality of queries by the trained machine learning module;

record the rank of each fragment into a data structure, wherein each fragment and the rank of the fragment are recorded in the data structure without a particular order;

calculate a minimum number of fragments (N) of the pre-defined duration (PD) required to cover the specific duration (SD), wherein (N−1)*PD<SD, and wherein N*PD≥SD;

select N elements using the criteria based on the rank of individual fragments wherein the rank of each fragment is considered according to an individual fragment selection criteria and a respective group rank of a plurality of individual fragments is considered according to a group fragment selection criteria; and truncate, if N*PD>SD, at least one fragment as a truncated fragment to make the total duration of all selected fragments including the truncated fragment equal to the specific duration (SD); and an inference module to generate the fragment of the specific duration (SD) by composing the selected fragments.

11. The system of claim 10, wherein the spatio-temporal encoding comprises a float-values vector ranging from 512 to 2048.

12. The system of claim 10, wherein the video processor is further configured to exclude a last fragment from the set of fragments if the length of the last fragment is less than the pre-defined duration (PD).

13. The system of claim 10, wherein the video processor is further configured to create a last fragment of the pre-defined duration (PD) that ends at the end of the video and overlaps with a previous fragment.

14. The system of claim 10, wherein the fragment selection criteria comprises selection of the first or last sequence of N consecutive fragments, N being a total number of consecutive fragments, with maximum value of a sum of the respective ranks of N fragments in the video.

15. The system of claim 10, wherein the fragment selection criteria comprises selection of the first of the N fragments with a highest rank.

16. The system of claim 10, wherein the fragment selection criteria comprises selection of N consecutive fragments with at least one of the following conditions:

starting with the first fragment with a maximum rank from the video, starting with the last fragment with a maximum rank from the video, ending with the first fragment with a maximum rank from the video, and ending with the last fragment with a maximum rank from the video.

17. The system of claim 10, wherein the ranking network is further configured to:

select a sequence of length N fragments with a highest sum of ranks, select, if the highest sum is achieved by two or more sequences, one sequence by implementing at least one of the following:

applying a set of predefined rules to select one sequence from the two or more sequences;

selecting a first sequence from amongst the two or more sequences;

selecting a last sequence from amongst the two or more sequences;

applying an external criterion to select the one sequence, wherein the external criterion includes information related to other highlights generated from the video.

18. The system of claim 17, wherein selection of a sequence of length N fragments with the highest sum of ranks further comprises using an additional criteria of the highest sum of ranks by including highest-ranking clips in the sequence or of the highest sum of ranks by including the largest sum of K out of N highest sum in the sequence.

19. The system of claim 10, further comprising a highlight generation module configured to receive a request for producing H different highlights from the video;

produce one highlight at a time; and exclude the produced highlight from a subsequent round of selection.

20. The system of claim 19, wherein a new highlight from a subsequent round of selection cannot start with S>=0 from the produced highlight, wherein S is a duration of time or a number of fragments.

* * * * *